United States Patent [19]

Breedveld et al.

[11] Patent Number: 4,494,716
[45] Date of Patent: Jan. 22, 1985

[54] WING FLAP ASSEMBLY AND AIRCRAFT PROVIDED THEREWITH

[75] Inventors: Cornelis A. Breedveld, Hoofddorp; Frans W. de Haan, De Hoef, both of Netherlands

[73] Assignee: Fokker B.V., Schiphol, Netherlands

[21] Appl. No.: 459,101

[22] Filed: Jan. 19, 1983

[30] Foreign Application Priority Data

Jan. 20, 1982 [NL] Netherlands ............... 8200197

[51] Int. Cl.³ ................................. B64C 9/00
[52] U.S. Cl. ...................... 244/213; 244/75 R
[58] Field of Search .............. 244/75 R, 76 R, 203, 244/211, 212, 213, 214, 215, 216, 217

[56] References Cited

U.S. PATENT DOCUMENTS

| | | | |
|---|---|---|---|
| 3,935,754 | 2/1976 | Comollo | 244/203 |
| 3,986,689 | 10/1976 | Maltby | 244/213 |
| 4,213,587 | 7/1980 | Roeseler et al. | 244/213 |
| 4,256,277 | 3/1981 | Embree | 244/213 |
| 4,260,121 | 4/1981 | Baston et al. | 244/213 |
| 4,305,177 | 12/1981 | Feifel | 244/213 |

Primary Examiner—Sherman D. Basinger
Assistant Examiner—Rodney Corl
Attorney, Agent, or Firm—Handal & Morofsky

[57] ABSTRACT

A wing flap assembly, in which each flap (1, 2) has its own suspension and drive mechanism (3-6) and in which two adjacent flaps substantially in line with each other have a part (16) connected for movement with one flap and extending between two abutments (18, 19) on the other flap so that, in case of a failure or disturbance in the suspension and drive mechanism of one flap, this flap is limited in movement with respect to the adjacent flap to avoid serious distorsions and other dangerous consequences of such a failure or disturbance. Preferably the part (16) extending between the abutments is a pivoting lever, so connected to one flap that it moves therewith in a plane substantially parallel to the chord plane (8) of the flaps if one flap moves with respect to the other one. Moreover, the abutments (18, 19) have adjacent switches (20, 21), so that the part (16) extending between the abutments contacts one of these switches if one flap moves too far with respect to the other flap, so as to give a warning signal about a disturbance or failure and to stop movement of the driving mechanism for the flaps.

4 Claims, 4 Drawing Figures

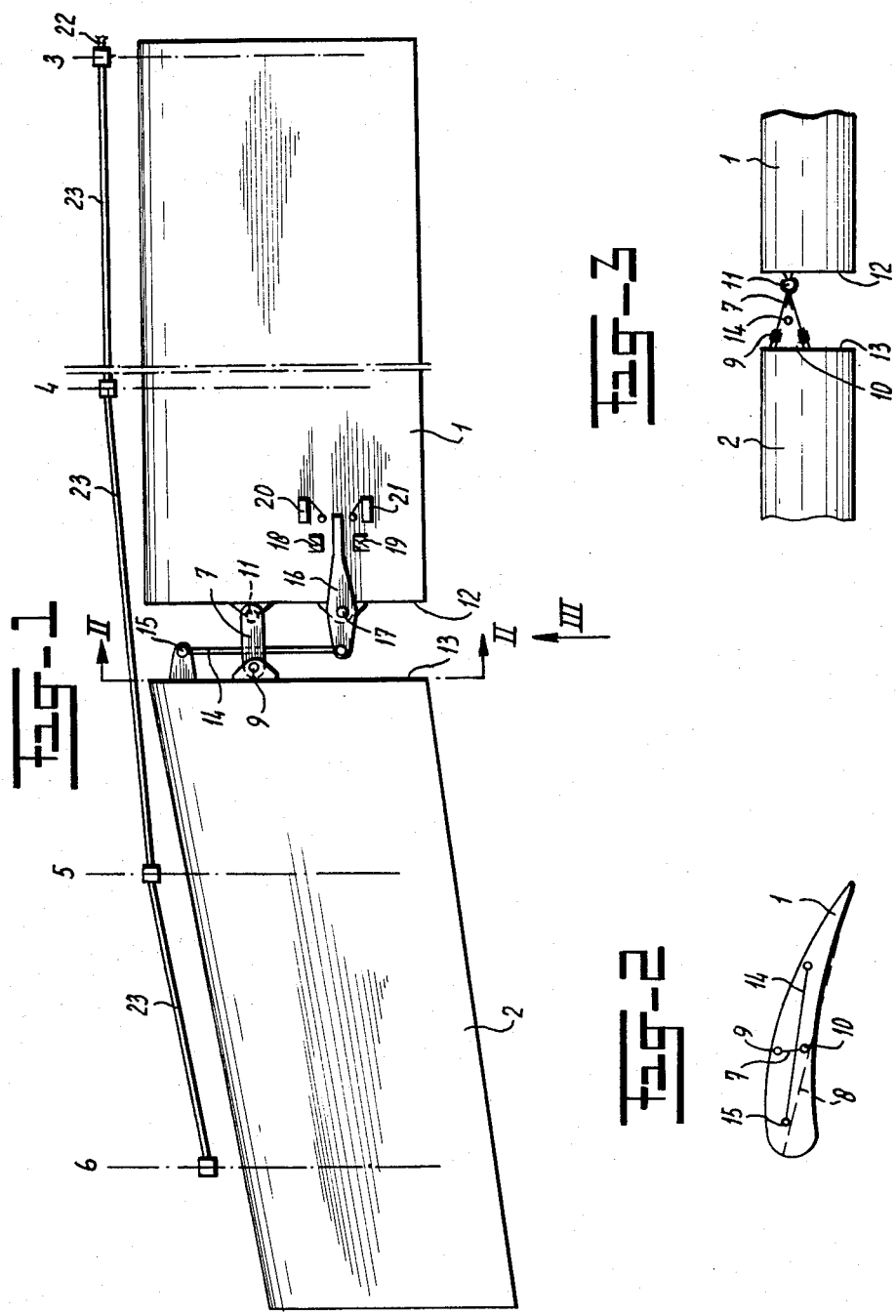

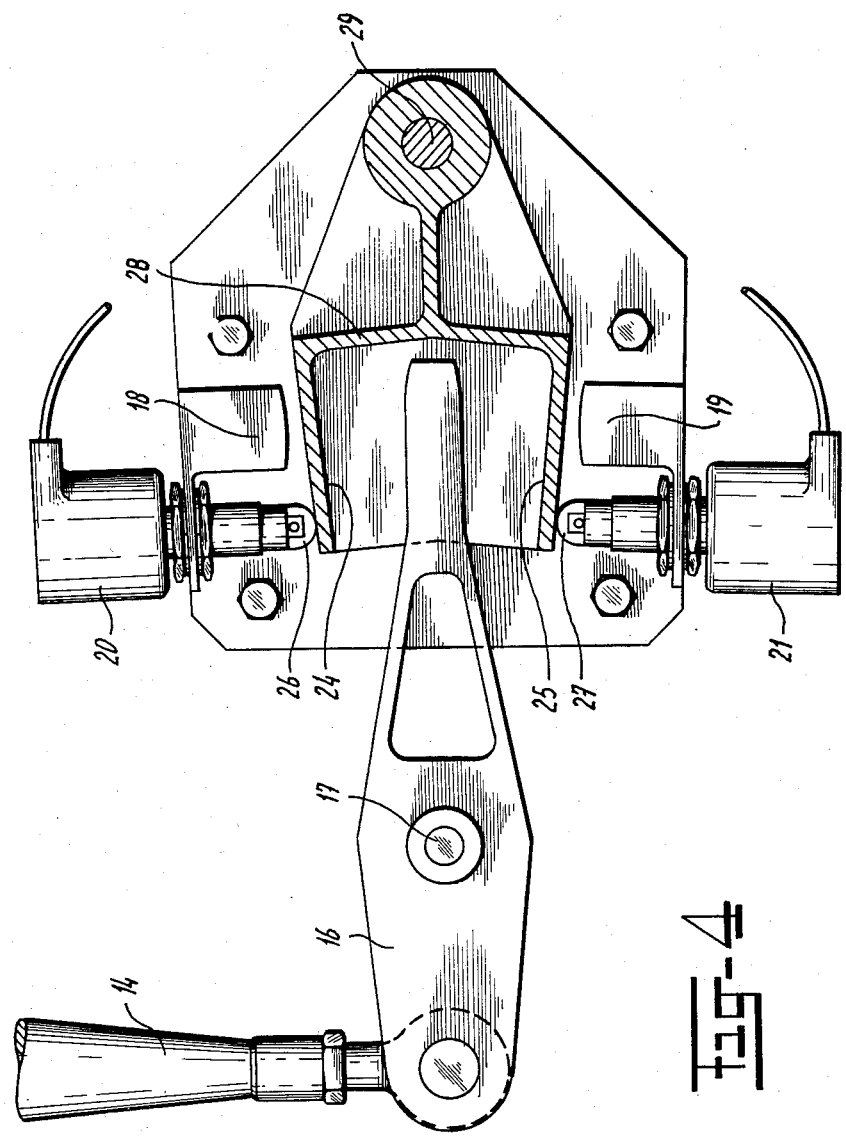

WING FLAP ASSEMBLY AND AIRCRAFT PROVIDED THEREWITH

BACKGROUND ART

Aircraft are often provided with movable flaps on the wings to increase lift and/or drag of the wing. Such flaps usually extend over a considerable part of the length of the wing, normally along the trailing edge but sometimes along the front edge or along both edges. They are supported by a number of suspending mechanisms from the primary wing structure, such mechanisms moving the flaps by a driving motor automatically or upon a human command operation.

For large aircraft it is possible to apply two or more separate flaps substantially in line with each other along the same wing edge, each flap having its own suspending and driving mechanism, usually driven by a common driving source such as a motor in the main body of the plane. It is known to connect such flaps mechanically.

This invention aims at increasing the safety of the assembly during failures in such suspending and driving systems.

DISCLOSURE OF THE INVENTION

This invention more specifically relates to a wing flap assembly for an aircraft with at least two wing flaps being positioned substantially in line with each other and being mechanically connected but each having its own suspension and driving mechanism and proposes, in order to reach the aim as given above, to connect one of said flaps to and for combined movement with a part protruding between two abutments on the other flap positioned in the possible path of movement of said part when one of the flaps moves with respect to said other flap and positioned to both sides of said protruding part to limit the stroke of movement of said part.

Failures and disturbances in suspension or drive means of one flap will thereby have less serious consequences because the adjacent flap will maintain said one flap at least substantially in its position, while nevertheless allowing, in normal operation, for slight mutual differences in synchronisation of the movements of the different flaps.

Preferably, such a structure is embodied in such a way that said parts, protruding part and abutments, cooperate with switch means provided on or near one (set) of said parts, abutments or protruding part, said switch means being operated by the other one of said (set of) parts near the ends of said stroke, in order to switch the flap drive mechanism to a stop position and/or to give a signal reporting a disturbance or failure.

This increases safety considerably as there is at least a warning that there is a disturbance or failure, and using the switch means to stop the drive means prevents the increase of the amount of failure, which may occur on further movement of the flaps by excessive setting and distortion and by the high forces generated thereby.

Each flap usually has a suspension in two points, sometimes more, and in most cases also a drive in said points. Thus, use of this invention means that disturbances in any of four suspension and drive means, two for each flap, are limited in effect and that the safety of those four set of means is warranted.

It is possible to apply a structure according to the invention in one or more points between the flaps and to have them limit the mutual possibilities of movement between the flaps in more than one direction. First of all, however, the invention is considered for operation substantially in the chord plane of the flaps, which means that mutual movements first of all in a direction in said plane are limited thereby.

This invention also relates to an aircraft with such an assembly structure.

The invention will now be explained in more detail with reference to the attached drawings, wherein:

BRIEF DESCRIPTION OF DRAWINGS

FIG. 1 shows a somewhat diagrammatic view perpendicular to two adjacent wing flaps of a preferred embodiment of this invention;

FIG. 2 is a diagrammatic view and section along the line II—II in FIG. 1;

FIG. 3 is a diagrammatic view from the rear according to arrow III in FIG. 1; and FIG. 4 shows a structurally more detailed view, partly in section of the lever with adjacent parts of FIG. 1.

DETAILED DESCRIPTION

Two wing flaps 1 and 2 have to move simultaneously and are each provided with suspension and drive mechanisms not shown, present at 3, 4, 5 and 6. It is assumed here that there is a common drive motor to the right past 22 in the plane for both flaps, of which motor the driving torque is, for example transmitted by rotation through shafts 23, having universal joints, to the mechanisms 3–6 on the wing. Each mechanism 3–6 may be of known embodiment, for example a linkage mechanism or a car-rail-mechanism.

Such known linkage mechanisms usually have a crank arm drivingly connected to shaft 23 and supported in the wing, the crank arm being connected by a linkage to the flap as is, for example known from U.S. Pat No. 3,985,319 and U.S. Pat. No. 4,172,575. Such car-rail mechanisms usually have a screw spindle in each of lines 3 to 6 in FIG. 1, rotated by shaft 23, a nut engaging the screw spindle to move along it on rotation of the spindle and a car connected to the nut and to the flap to move the flap on rotation of the spindle, as is, for example known from U.S. Pat. No. 2,609,166. Other possibilities for such mechanisms are given in many other patent specifications and other literature, for example in U.S. Pat. No. 2,836,380, in U.S. Pat. No. 1,508,389 and in German Patent Specification No. 692,059. As this invention itself is not directly related to such mechanisms for supporting and moving the flaps, no further details thereof are given in this specification and in the drawings.

Disturbances or failures in the shaft 23 are easily checked by means known, as such for checking synchronous movements at the ends thereof, but it would make the system very complex if for each separate drive and suspension means for the flaps such or other check means would have to be used.

The two flaps 1 and 2 are first of all connected against mutual movement away from their common main plane while remaining parallel and against longitudinal movements away from each other by a triangular link 7. This link 7 is positioned in a plane substantially perpendicular to chord plane 8 of the flaps (FIG. 2). In each corner this link has a pivot connection with one of the flaps 1, 2, at 9 and 10 with flap 2 and at 11 with flap 1, there being a ball (universal) joint at 11. This connection allows some movement of one flap with respect to the other in a direction perpendicular to the plane of link 7 and allows some tilting of the longitudinal axis of one flap with respect to the longitudinal axis of the other flap. This connection gives a good transmission of forces between the flaps substantially perpendicular to the chord plane 8 and in the longitudinal direction of the flaps.

A rod 14 connects a point 15 on flap 2 to a lever 16 on flap 1 through ball or other universal joints. This rod 14 extends substantially in the chord plane 8 of the flaps (FIG. 2). A lever 16 is pivotable about a normal pivot pin 17 on flap 1, extends between two abutments 18, 19 on said flap and protrudes past said abutments to extend between two switches 20, 21. At failures or disturbances, the flaps 1 and 2 thus remain connected for transmitting forces about in their chord plane, but with a certain mutual freedom of movement, determined by the distance between levers 16 and these abutments 18, 19. In normal operation the lever 16 will remain in a position about midway between these abutments because the suspending and drive mechanisms 3 to 6 direct and position the flaps accurately in their movements forwardly and backwardly. If, however, a connection in one of these mechanisms is ruptured, it would as such be possible for the concerning flap to set and distort, and in this case lever 16 will hit on one of the abutments 18, 19, which will limit such distortion to a safe value.

The switches 20 and 21 are positioned so that they become operative by contact with lever 16 shortly before lever 16 will contact the adjacent abutment 18 or 19 through an electric signal line, which, for example is guided along the pivots of the suspending mechanism 4 into the plane body; it is possible to stop the flap driving mechanism if any of these switches gives a signal of contact with lever 16, so that further distorsion is avoided. Moreover, a warning signal can be derived therefrom to report a disturbance or failure.

The space between the flaps may, if desired, be closed by flexible elastic closing means around the mechanism as described, in such a way that the flaps aerodynamically behave as a smooth unitary body.

It may of course be advantageous to bring the adjacent terminal edges of the flaps closer together and to position the connecting mechanism as described more inside the edge part of the flaps instead of protruding from the edges thereof as shown.

The device according to the invention is well suited for flaps as shown, which are not accurately in line with each other, but at an angle (FIG. 1), also when the drive mechanisms do not apply exactly the same stroke to the flaps. It may e.g. be advantageous in the case of FIG. 1 to always give the same stroke to moving mechanisms 3 and 4 and to give to mechanism 5 a longer stroke than to mechanism 6.

It is seen from FIG. 4 that the abutments 18 and 19 may be united with the switches 20 and 21 to an integral structure, easy to manufacture, to mount, to remove and to check. In this embodiment the lever 16 does not itself act directly on the abutments, but by the intermediary of a bell clapper body 28, which at 29 is pivotally supported and is provided with two wall parts 24 and 25, engaging as a kind of fork teeth about the end of lever 16. The body 28 is maintained in its neutral position by small rollers 26 and 27, each being maintained in the positions shown in a casing part of their switches 20 and 21 respectively by a rather strong spring pushing these rollers onto body 28.

As soon as lever 16 is rotated into contact with wall part 24 or 25 of body 28, it rotates this body about pivot 29 so that one of said wall parts pushes the concerning roller 26 or 27 towards and more into its switch casing against said spring action so as to operate the concerning switch 20 or 21 after a short path of movement of the concerning roller 26 or 27 and just before body 28 contacts one of the abutments 18 or 19 by one of its wall parts 24 or 25.

We claim:

1. A wing flap assembly for an aircraft, comprising, at least two wing flaps positioned substantially in line with each other and mechanically connected to each other, each of said wing flaps having its own suspension and drive mechanism, one of said flaps being connected to a part for combined movement therewith, said part protruding between two abutments on the other flap, said abutments positioned on opposite sides of the protruding portion of said protruding part to limit the stroke of movement of said part, said one flap being pivotally connected to a lever pivotally mounted on the other flap at a distance from its pivotal connection to said one flap, said lever being integral with said protruding part which protrudes from the pivotal mounting to cooperate with said abutments.

2. An assembly according to claim 1, in which said pivotal connection of the said one flap with the lever on the other flap comprises a pivoting link rod extending substantially parallel to the chord plane of the flaps, the lever being pivotally supported about a pivot axis extending substantially perpendicular to said chord plane.

3. A wing flap assembly for an aircraft, comprising, at least two wing flaps positioned substantially in line with each other and mechanically connected to each other, each of said wing flaps having its own suspension and drive mechanism, one of said flaps being connected to a part for combined movement therewith, said part protruding between two abutments on the other flap, said abutments positioned on opposite sides of the protruding portion of said protruding part to limit the stroke of movement of said part, said protruding portion and said abutments cooperating with switch means provided on or near said abutments or said protruding portion, said switch means being operated by the other of said protruding portion or said abutments near the ends of said stroke, in order to switch the flap drive mechanism to a stop position and/or to give a signal reporting a disturbance or failure.

4. A wing flap assembly for an aircraft, comprising, at least two wing flaps positioned substantially in line with each other and mechanically connected to each other, each of said wing flaps having its own suspension and drive mechanism, one of said flaps being connected to a part for combined movement therewith, said part protruding between two abutments on the other flap, said abutments positioned on opposite sides of the protruding portion of said protruding part to limit the stroke of movement of said part, the abutments on the said other flap being engaged by a fork shaped body pivotally supported by said other flap, said moving part protruding between the abutments and extending between the teeth of said fork shaped body so as to be adapted to contact said teeth to pivot the fork shaped body, said teeth at their outer side each cooperating with one of said abutments and each engaging a feeler pushed onto its tooth under spring action, said feeler operating as a switch when moved outwardly by its contacting fork tooth against said spring action.

* * * * *